(12) United States Patent
Postill

(10) Patent No.: US 8,096,338 B2
(45) Date of Patent: Jan. 17, 2012

(54) METHOD AND APPARATUS FOR APPLYING SHEET MATERIAL TO A VEHICLE

(76) Inventor: Michael Alan Postill, Oldsmar, FL (US)

( * ) Notice: Subject to any disclaimer, the term of this patent is extended or adjusted under 35 U.S.C. 154(b) by 259 days.

(21) Appl. No.: 12/566,955

(22) Filed: Sep. 25, 2009

(65) Prior Publication Data

US 2011/0073247 A1    Mar. 31, 2011

(51) Int. Cl.
- B65H 37/04 (2006.01)
- B29C 65/48 (2006.01)
- B32B 37/00 (2006.01)
- B32B 39/00 (2006.01)

(52) U.S. Cl. .................. 156/540; 156/552; 156/598

(58) Field of Classification Search .......... 156/71, 156/247, 249, 289, 701, 719, 537, 540, 552, 156/598

See application file for complete search history.

(56) References Cited

U.S. PATENT DOCUMENTS

| | | | |
|---|---|---|---|
| 3,317,157 A | 5/1967 | Leiber | |
| 4,547,119 A * | 10/1985 | Chance et al. | 414/735 |
| 4,782,648 A | 11/1988 | Van Ottele | |
| 5,092,954 A * | 3/1992 | Braun et al. | 156/540 |
| 5,148,651 A * | 9/1992 | Masuda et al. | 53/381.2 |
| 5,148,654 A * | 9/1992 | Kisters | 53/462 |
| 5,282,346 A * | 2/1994 | Masuda et al. | 53/118 |
| 5,307,609 A | 5/1994 | Kurata | |
| 5,529,655 A * | 6/1996 | Bravet et al. | 156/244.17 |
| 5,603,198 A | 2/1997 | Rimondi | |
| 5,624,525 A * | 4/1997 | Ehara et al. | 156/360 |
| 5,997,670 A | 12/1999 | Walter | |
| 6,001,198 A * | 12/1999 | Habisreitinger et al. | 156/64 |
| 6,253,532 B1 * | 7/2001 | Orpen | 53/441 |
| 6,289,652 B1 * | 9/2001 | Lancaster et al. | 53/399 |
| 6,514,371 B2 * | 2/2003 | Justin | 156/229 |
| 6,528,109 B1 * | 3/2003 | Filev et al. | 427/9 |
| 6,554,040 B1 * | 4/2003 | Cueff et al. | 156/391 |

(Continued)

FOREIGN PATENT DOCUMENTS

DE         3513056 A  * 10/1985

(Continued)

OTHER PUBLICATIONS

Englsih Abstract of JP 08-150872A (Aug. 5, 2011).*

(Continued)

*Primary Examiner* — Sing P Chan
(74) *Attorney, Agent, or Firm* — Larson & Larson, P.A.; Frank Liebenow; Justin Miller

(57) ABSTRACT

An application for an apparatus that holds a sheet of material as it is applied to a surface of a vehicle. The apparatus includes support arms for holding the sheet of material in position against the surface of the vehicle while the sheet of material is applied to the surface. The apparatus is adjustable to compensate for various heights of vehicles, various application angles and application of the sheet to various surfaces of the vehicle including a top surface and a side surface.

19 Claims, 10 Drawing Sheets

U.S. PATENT DOCUMENTS

| | | | |
|---|---|---|---|
| 6,699,346 B1 * | 3/2004 | Nordmann et al. | 156/229 |
| 6,773,537 B2 * | 8/2004 | Erickson et al. | 156/250 |
| 6,777,668 B2 * | 8/2004 | Krieg et al. | 250/239 |
| 7,459,051 B2 * | 12/2008 | Habisreitinger et al. | 156/230 |
| 7,686,910 B2 * | 3/2010 | Habisreitinger et al. | 156/249 |
| 2001/0035258 A1 * | 11/2001 | Justin | 156/229 |
| 2003/0183327 A1 * | 10/2003 | Titze | 156/212 |
| 2006/0151085 A1 * | 7/2006 | Habisreitinger et al. | 156/54 |
| 2006/0169398 A1 * | 8/2006 | Haibistritinger et al. | 156/229 |
| 2007/0140823 A1 * | 6/2007 | Dorner et al. | 414/685 |
| 2007/0227645 A1 * | 10/2007 | Habisreitinger et al. | 156/160 |
| 2007/0277932 A1 * | 12/2007 | Aveldson et al. | 156/358 |
| 2007/0284046 A1 * | 12/2007 | Habisreitinger et al. | 156/352 |
| 2008/0000070 A1 | 1/2008 | Hotz | |
| 2009/0301634 A1 * | 12/2009 | Malecki et al. | 156/64 |
| 2011/0073247 A1 * | 3/2011 | Postill | 156/249 |
| 2011/0113683 A1 * | 5/2011 | Morgan | 47/22.1 |

FOREIGN PATENT DOCUMENTS

| | | | |
|---|---|---|---|
| DE | 10258891 | | 12/2002 |
| EP | 394190 A | * | 10/1990 |
| EP | 1717149 | | 2/2006 |
| GB | 2143498 A | * | 2/1985 |
| GB | 2410473 A | * | 8/2005 |
| IT | I950003 | | 4/1995 |
| JP | 08150872 A | * | 6/1996 |
| WO | WO0076750 | | 12/2000 |

OTHER PUBLICATIONS

English Abstract of DE 3513056A (Aug. 5, 2011).*

* cited by examiner

METHOD AND APPARATUS FOR APPLYING SHEET MATERIAL TO A VEHICLE

FIELD OF THE INVENTION

This invention relates to the field of decorating vehicles and more particularly to method and apparatus for applying sheets of material to a vehicle.

BACKGROUND

Many vehicles nowadays carry advertisement or other decorations. In the past, the advertisement or design was applied by an artist hand painting the advertisement or design onto the vehicle, such as hand painting a company name, address and phone number on a car door.

Recently, with the advent of new materials, the advertisement or design is created on a sheet of material away from the vehicle and later applied to the vehicle, using an adhesive applied to the sheet of material or an adhesive backed sheet of material. In such, a print shop would create the design or advertisement with a computer system and transfer that design or advertisement to a sheet of material and all or part of that sheet of material is applied to the vehicle. For example, the same company name, address and phone number is printed on a sheet of adhesive-backed vinyl, scored around the letters and number, applied to a door of a car, then the vinyl around the letters and numbers is peeled off, leaving only the letters and numbers.

In the past few years, printing and transfer systems have progressed to enable creation of large sheets of material on which such information and designs are printed or transferred. The sheets often cover the entire side or top surface of a vehicle (e.g. car, truck, van, bus, boat, etc). These printing and transfer systems are now affordable by many small operations such as sign shops, detailing shops, printing shops, etc. Often, such operations are very limited with respect to space and personnel, often operating with a single vehicle bay and a sole proprietor. In order to apply a sheet the length of many vehicles, there was no way for the operator to hold the material in a correct orientation, and then apply the material without introducing bubbles beneath the material or skewing the material. As a way to cover a vehicle side, these small operations often resorted to cutting the sheet material into manageable sizes then reconstructing the sheet on the vehicle. Such an operation is very time consuming and, if not carefully applied, will result in mis-registration of the designs and/or tolerance build-up in which the designs will slope towards one end of the vehicle.

What is needed is a method and apparatus that will support a sheet of material while it is being applied to a vehicle.

SUMMARY OF THE INVENTION

The present invention includes an apparatus for holding a sheet of material that is to be applied to a surface of a vehicle. The apparatus includes support arms for holding the sheet of material in position against the surface of the vehicle while the sheet of material is applied to the surface. The apparatus is adjustable to compensate for various heights of vehicles, various application angles and application of the sheet to various surfaces of the vehicle including a top surface and a side surface.

In one embodiment, an apparatus for holding a sheet of material for application of the sheet of material onto a vehicle is disclosed including a base and a riser. A bottom end of the riser is affixed to the base and the riser extends vertically from the base. Extension arms are affixed to the top end of the riser. Outward ends of the extension arms extend outwardly from the riser at an adjustable distance from the riser. A left support arm is affixed to a left end of the extension arms and a right support arm is affixed to a right end of the extension arms. A sheet of material is supported between the left support arm and the right support arm.

In another embodiment, a method of applying a sheet of material to a vehicle is disclosed including providing an apparatus for holding a sheet of material for application of the sheet of material onto a vehicle and has a base and a riser. A bottom end of the riser is affixed to the base and the riser extends vertically from the base. Extension arms are affixed to the top end of the riser. Outward ends of the extension arms extend outwardly from the riser at an adjustable distance from the riser. A left support arm is affixed to a left end of the extension arms and a right support arm is affixed to a right end of the extension arms. The method steps include extending the extension arms to a point at which the left support arm and right support arm are at a distance apart sufficient for a length of the sheet of material and affixing a first end of the sheet of material to the left support arm and a second end of the sheet of material to the right support arm. Next, the apparatus for holding the sheet of material is positioned adjacent to a surface of the vehicle onto which the sheet of material is to be applied and the sheet of material is applied to the surface of the vehicle.

In another embodiment, an apparatus for holding a sheet of material for application of the sheet of material onto a vehicle is disclosed. The apparatus includes a base with a riser having a bottom end and a distal top end. The bottom end of the riser is affixed to the base and the riser extends vertically from the base. The height of the riser is adjustable. Extension arms are affixed to the distal top end of the riser and outward ends of the extension arms extend outwardly from the riser at an adjustable distance from the riser. A left support arm is affixed to a left end of the extension arms by a hinge and a right support arm is affixed to a right end of the extension arms by a hinge.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
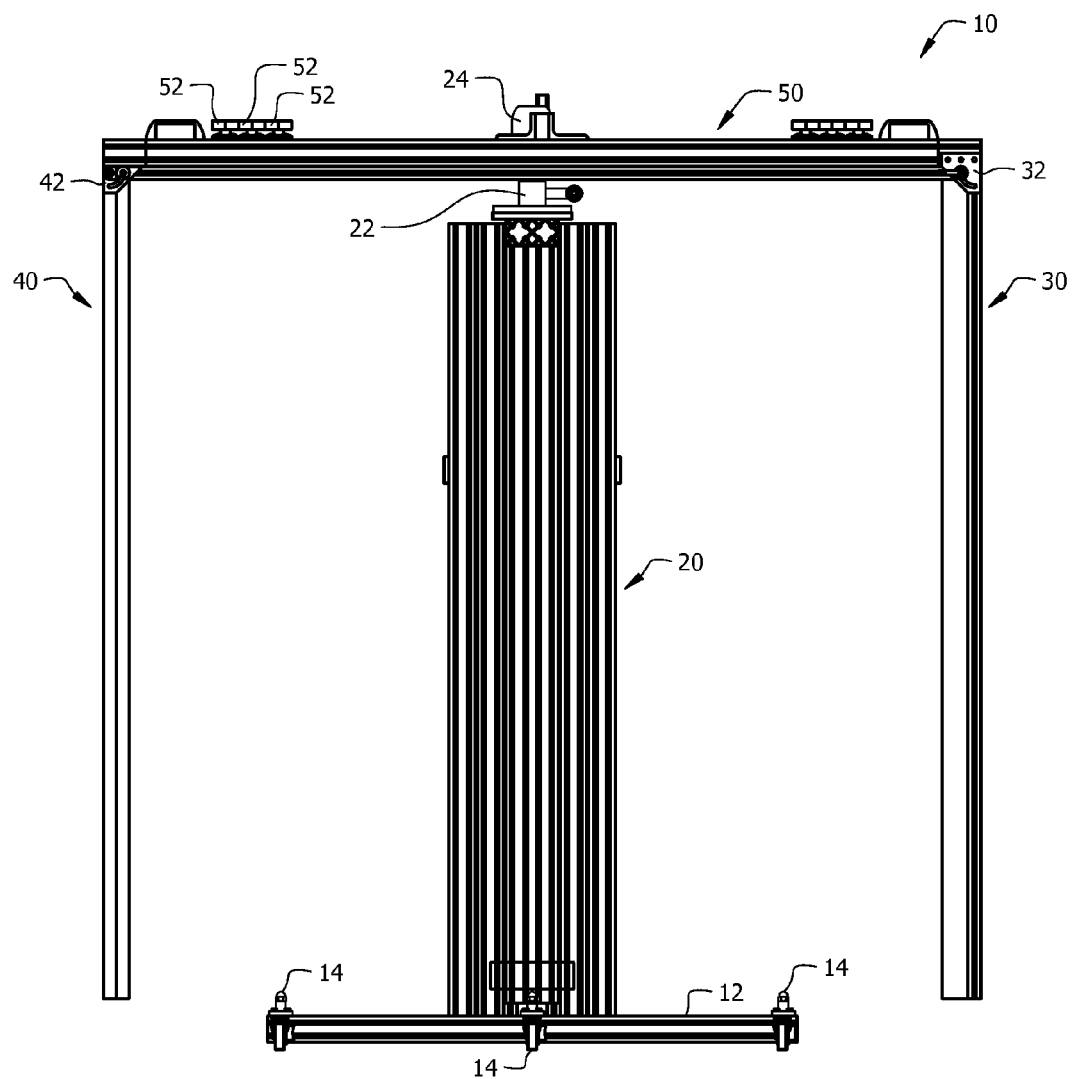
FIG. 1 illustrates a front cross section of an apparatus of the present invention with all extensions retracted.

Reference will now be made in detail to the presently preferred embodiments of the invention, examples of which are illustrated in the accompanying drawings. Throughout the following detailed description, the same reference numerals refer to the same elements in all figures. The present invention is useful in applying various sizes of sheets of material such as vinyl to a vehicle, particularly to an exterior surface of the vehicle. The present invention is useful with any size and type of sheet and vehicle including, but not limited to, cars, vans, mini-vans, buses, boats, airplanes, etc. It is also anticipated that the present invention be applicable to installing large sheets of material to other objects such as above ground pools, sheds, buildings, storage tanks, etc. on walls, ceilings, floors, etc. Any sheet of material is anticipated such as continuous sheets of vinyl and RTA (Ready To Apply) Vinyl.

Referring to FIG. 1, a front cross section of an apparatus 10 of the present invention with all extensions retracted is shown. Although this exemplary sheet holding apparatus 10 is shown in great detail, enabling the present invention, it is anticipated that many other embodiments are possible without veering from the intent and operation of the claimed invention. Substitutions of other extensions mechanisms, hinge mechanisms, tilt mechanisms, stands, etc, are all covered in the present application.

Figure 10A:
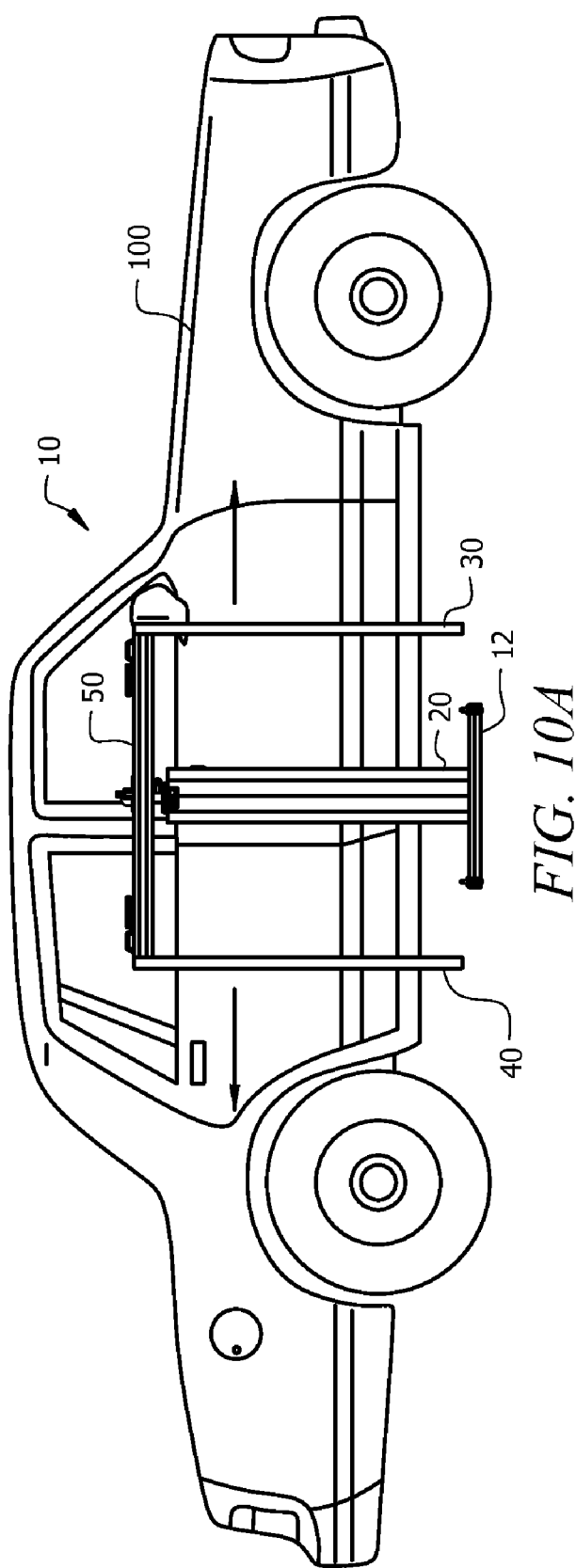
FIG. 10A illustrates a schematic view of the present invention in collapsed mode and next to a target vehicle.
Figure 10B:
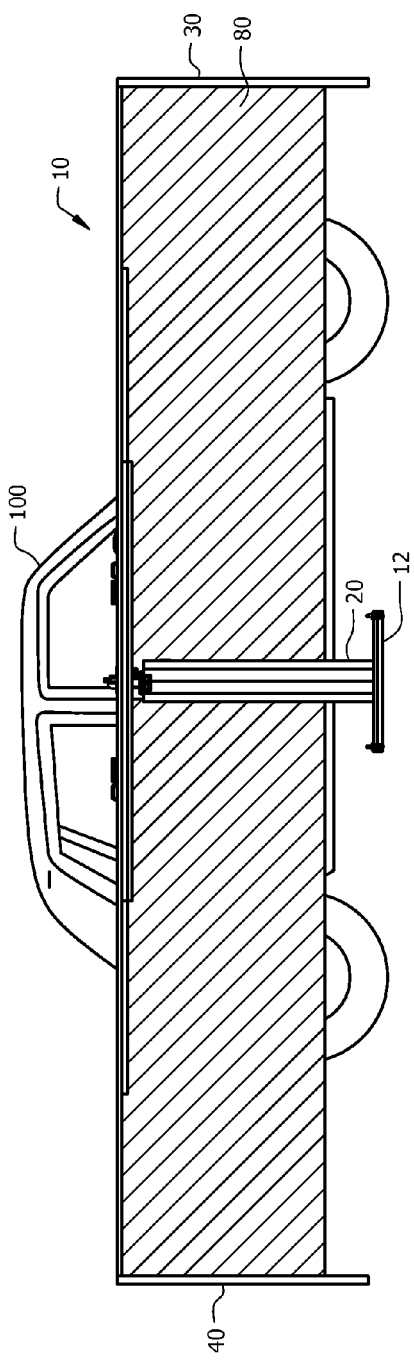
FIG. 10B illustrates a schematic view of the present invention in expanded mode, next to a target vehicle holding a sheet of material.
Figure 10C:
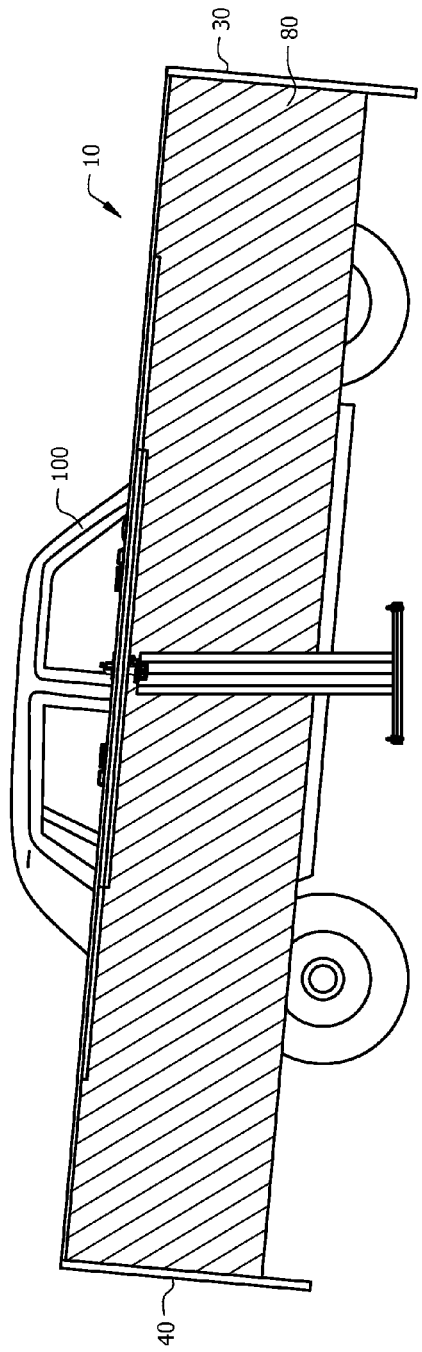
FIG. 10C illustrates a schematic view of the present invention in expanded mode and tilted to match the tilt of the target vehicle, holding a sheet of material.

The exemplary sheet holding apparatus 10 is supported by a base 12 and in some embodiments, the base 12 is equipped with one or more wheel or sliding devices 14 (e.g. ball in socket, etc) to enable relocation and adjustment of the sheet holding apparatus 10 against a vehicle 100 (see FIGS. 10A-C).

Connected to the base 12 is an adjustable riser system 20. Details of the exemplary adjustable riser system 20 are shown in FIG. 2, in which the adjustable riser system 20 is extended.

Figure 4:
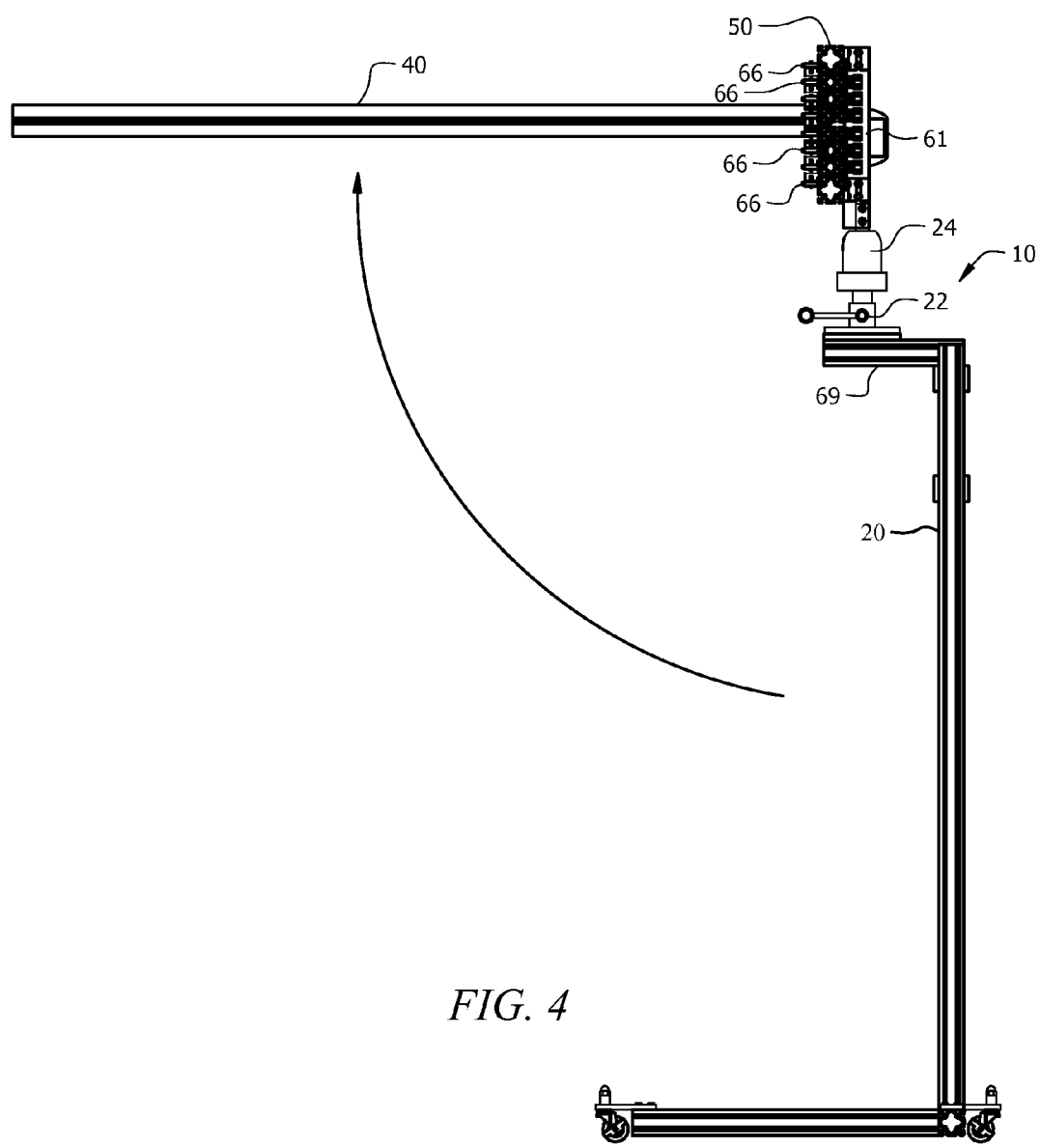
FIG. 4 illustrates a side cross section of an apparatus of the present invention with the holding arms turned horizontal.

Extension arms 50 are attached to the adjustable riser system 20 by a position control interfaces 22/24. The lower position control interface 22 provides for horizontal rotation of the extension arms 50 with respect to the base 12. The upper positional control interface 24 provides for vertical tilt adjustment of the extension arms 50 as shown in FIG. 10C and extension angle adjustment as shown in FIG. 4. Several stops 52 are visible on the extension arms 50, which will be described with FIGS. 6 and 7.

A right support arm 30 is connected to the right end area of the right extension arm 50 by a hinge 32. A left support arm 40 is connected to the left end area of the left extension arm 50 by a hinge 42. The hinges 32/42 permit the support arms 30/40 to be positioned at an angle to the extension arms 50. It is intended that the sheet of material 80 (see FIGS. 10B and 10C) be affixed at one end to the left support arm 40 and at the opposite end to the right support arm 30. The sheet of material 80 is affixed by its own adhesive backing, by tape (e.g. masking tape), by clamps (not shown) on the support arms 30/40 or any known way of such temporary attachment.

Figure 2:
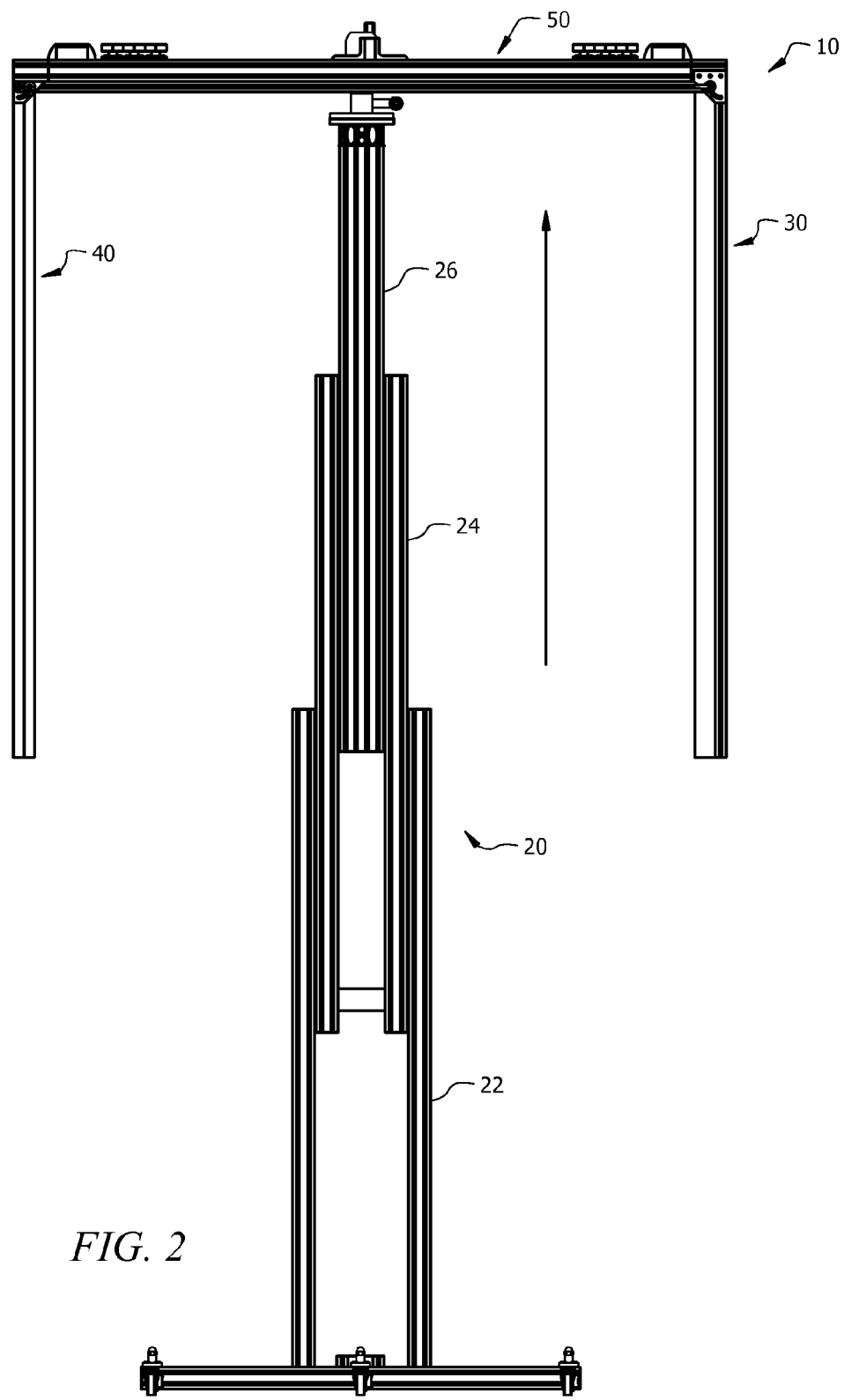
FIG. 2 illustrates a front cross section of an apparatus of the present invention vertically extended.

Referring to FIG. 2, a front cross section of an apparatus 10 of the present invention vertically extended is shown. The exemplary sheet holding apparatus 10 is supported by a base 12 and in some embodiments, the base 12 is equipped with one or more wheel or sliding devices 14 (e.g. ball in socket, etc) to enable relocation and adjustment of the sheet holding apparatus 10 against a vehicle.

Figure 8:
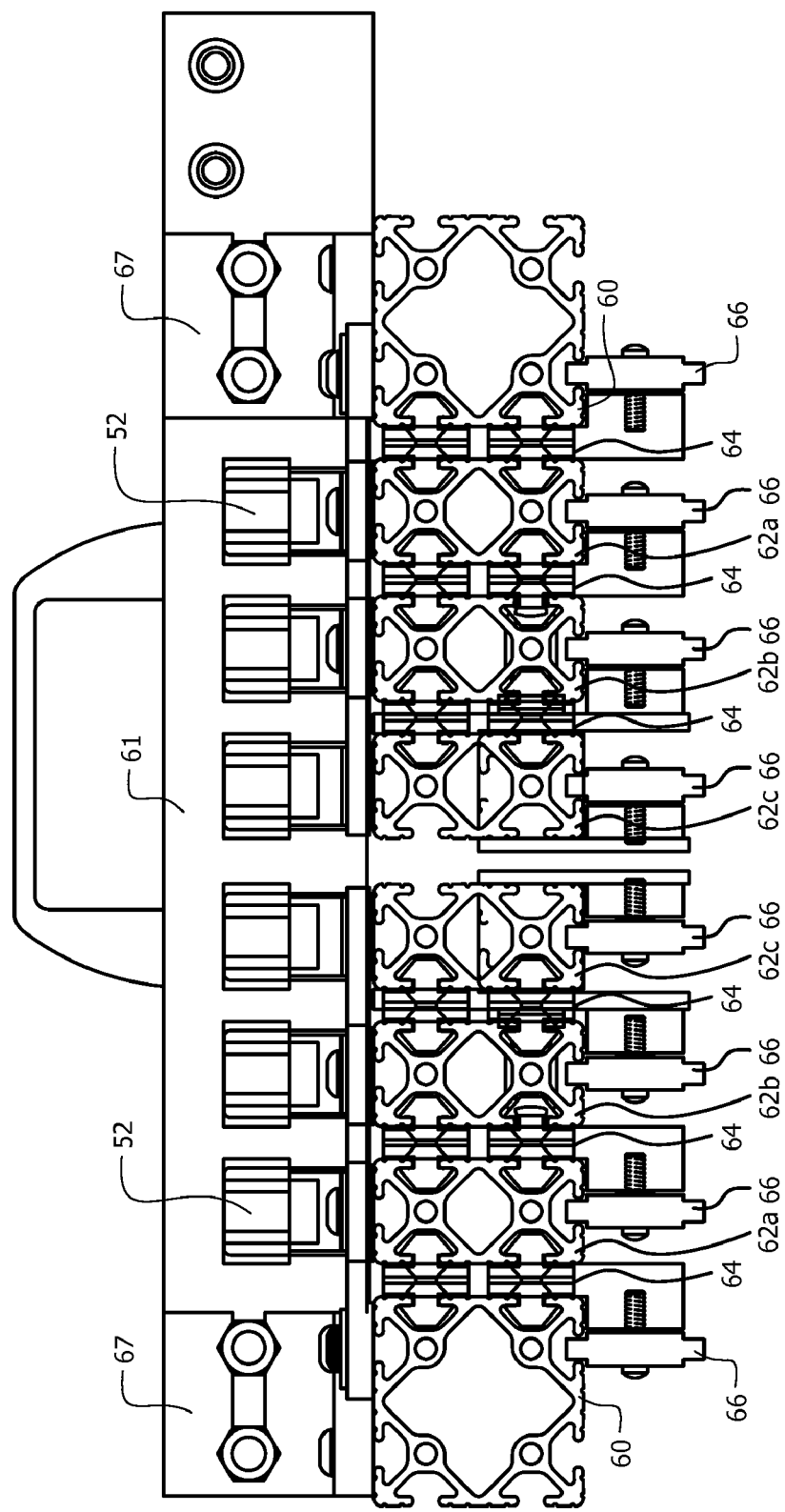
FIG. 8 illustrates a detail cross section of the extension arms of the present invention.
Figure 9:
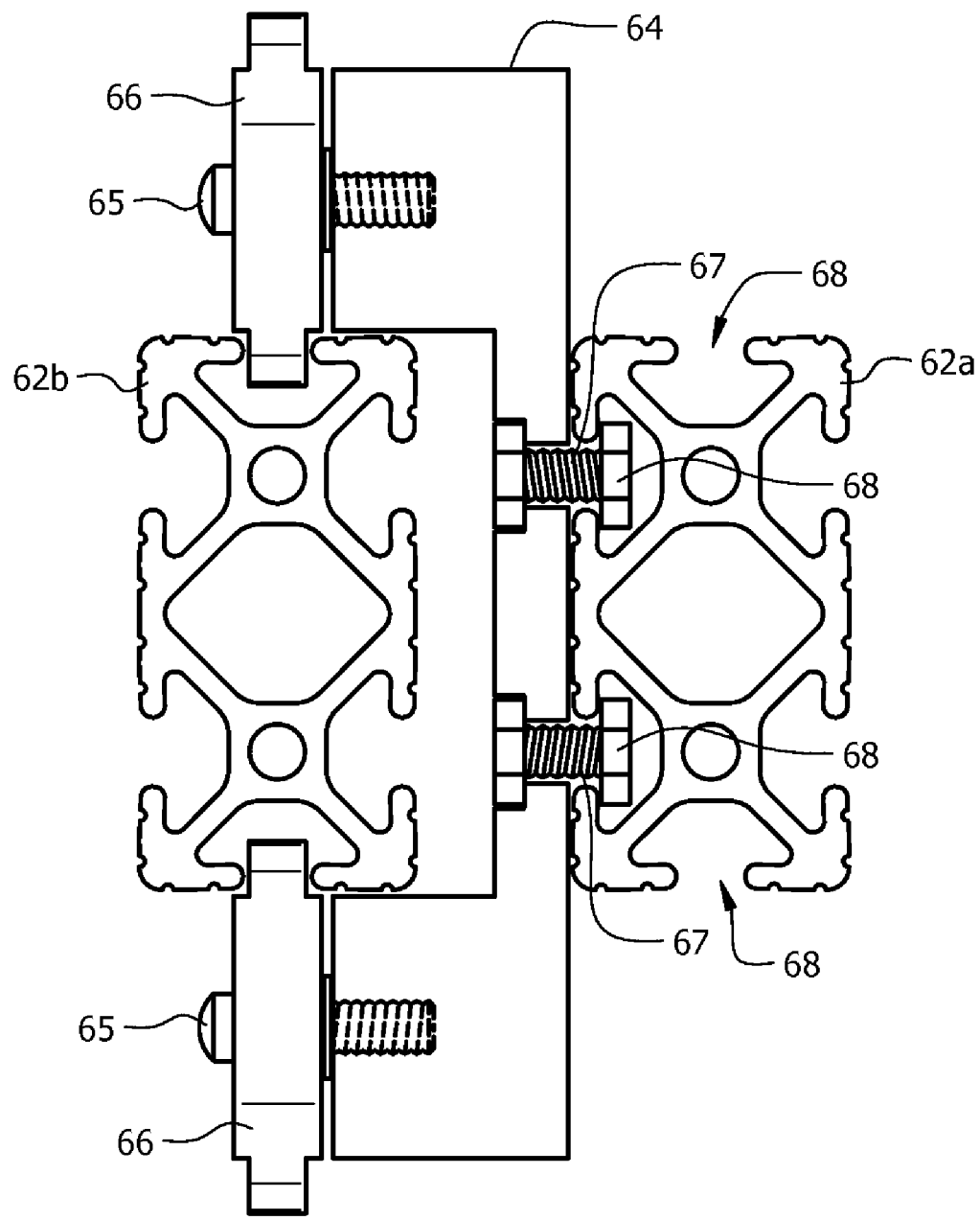
FIG. 9 illustrates a detail cross section of the slideable interface between two extension arms of the present invention.

Connected to the base 12 is an adjustable riser system 20. In this view, the adjustable riser system 20 is shown fully extended having an interior riser section 26, a medial riser section 24 and an exterior riser section 22. In this exemplary riser system 20, the same rail 62 and wheel 64 interface as will be described with FIGS. 8 and 9 are used, although any adjustable riser system 20 is anticipated to adjust the height of the system. Other types of adjustable riser systems 20 include telescoping systems, hydraulic systems, manually lifted systems with locking, etc.

As described previously, extension arms 50 are attached to the adjustable riser system 20 by a position control interfaces 22/24 and a right support arm 30 is connected to the right end area of the right extension arm 50 by a hinge 32 and a left support arm 40 is connected to the left end area of the left extension arm 50 by a hinge 42.

Figure 3:
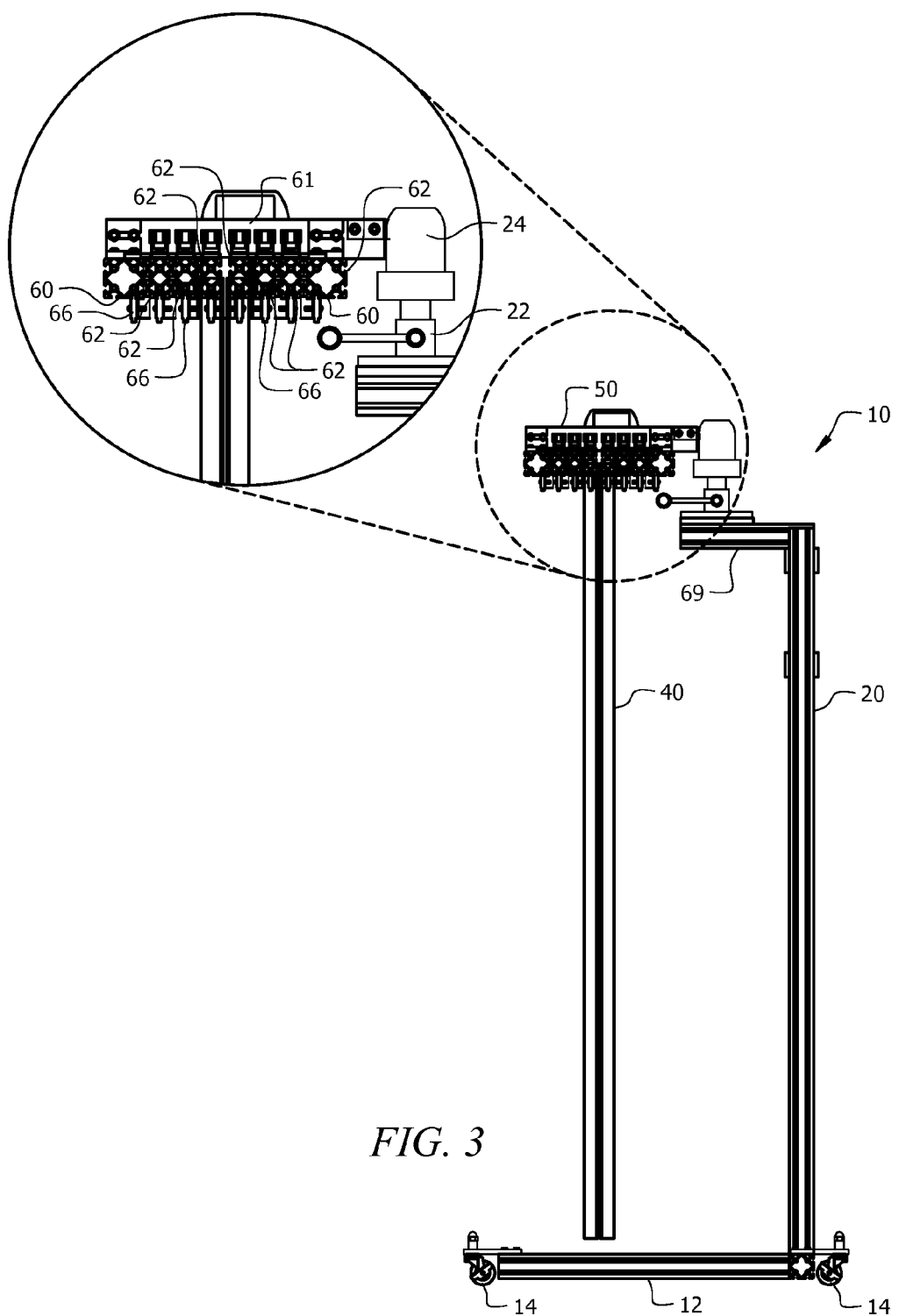
FIG. 3 illustrates a side cross section of an apparatus of the present invention.

Referring to FIGS. 3 and 4, side cross section of an apparatus 10 of the present invention is shown with the support arms 30/40 (only the left support arm 40 is visible) vertical (FIG. 3) and turned horizontal (FIG. 4). Any angle is anticipated including 90 degrees (horizontal) for installing the sheet of material on the hood/roof of a vehicle, etc. The support arms 30/40 swing outwardly by way of a hinge joint 24 that permits the extension arms 50 and support arms 30/40 to swing outwardly away from the riser system 20 to any desired angle. Once positioned correctly, the hinge joint 24 is locked to maintain the position of the support arms 30/40 for application of the sheet of material 80.

As shown in the side view of FIGS. 3 and 4, the extension arms 50 are made of several extension rails 60/62, coupled to each other by wheel systems 66 (see FIGS. 8 and 9). The stationary rails 60 are interfaced to a cross member 61 and the cross member is interfaced to the hinge joint 24. The hinge joint 24 is rotatably interfaced to a horizontal support 69 that is connected to the riser system 20. The slideable rails 62 are held parallel to and interfaced to the stationary rails 60 and to each other by a slideable interface such as that shown in FIG. 9.

Figure 5:
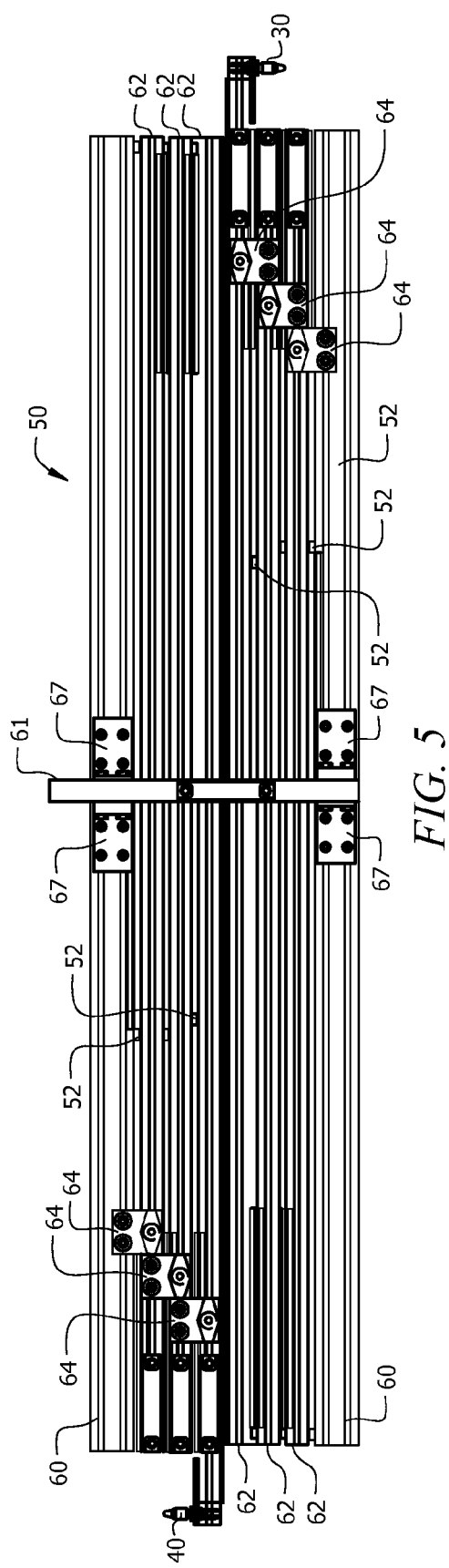
FIG. 5 illustrates a top cross section of an apparatus of the present invention with all extensions arms retracted.

Referring to FIG. 5, a top cross section of an apparatus 10 of the present invention with all extensions arms retracted is shown. Although there are many apparatus known for extension, the extension arms 50 produce very good results. Each extension arm 50 includes a stationary arm 60 and one or more slideable arms 62. The stationary arms 60 are interfaced to the cross member 61 by brackets 67 that are in turn, interfaced to the adjustable riser system 20 by a cross member 69. A first set of the slideable arms 62 interface to the stationary arms 60 using wheel trucks 64 and wheels 66 as shown in FIGS. 8 and 9. Likewise, each of the slideable arms 62 interface to the next slideable arm 62 using the same wheel trucks 64 and wheels 66 as shown in FIGS. 8 and 9. In this way, the slideable arms 62 are easily extended until the wheels 66 are stopped by the stops 52, thereby preventing the slideable arms 62 from extending too far. Although shown having three slideable arms 62 per side, any number of slideable arms 62 is anticipated. Furthermore, other mechanisms to provide extendable arms are also anticipated and the present invention is not limited by the particular mechanism described.

Figure 6:
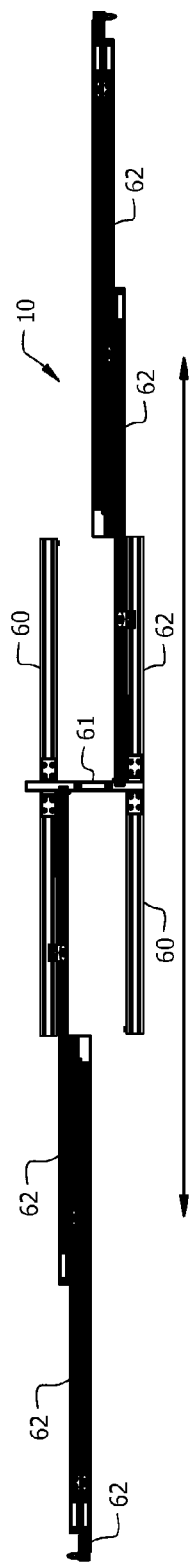
FIG. 6 illustrates a top cross section of an apparatus of the present invention showing the extension arms partially extended.
Figure 7:
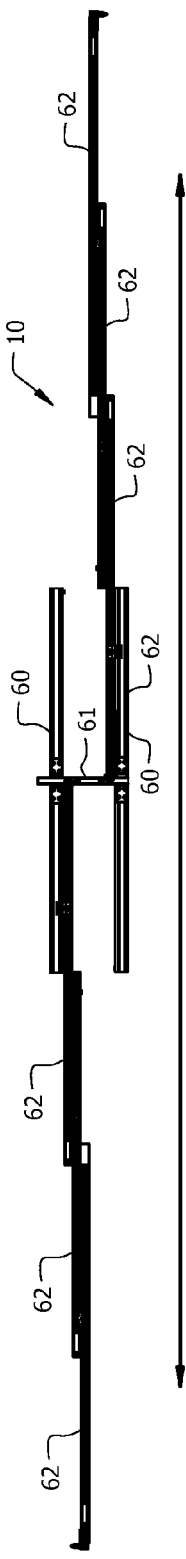
FIG. 7 illustrates a top cross section of an apparatus of the present invention showing the extension arms fully extended.

Referring to FIGS. 6 and 7, a top cross section of an apparatus 10 of the present invention showing the extension arms 50 partially and fully extended. In FIG. 6, the first two slideable arms 62 are extended and the third slideable arm 62 is not, whereas in FIG. 7, all three slideable arms 62 are extended fully from the stationary arms 60.

Referring to FIG. 8, a detail cross section of the extension arms 50 of the present invention is shown. The extension arms 50 are supported by the cross member 61 and the stationary arms 60 are affixed to the cross member 61 by, for example screws, etc. The first set of slideable arms 62a is slideably interfaced to the stationary arms 60 by wheel trucks 64 and wheels 66 (see FIG. 9 for a detail description of the wheel trucks 64 and wheels 66; Note that the upper wheel 66 is not visible, hidden by the cross member 61). In this way, the first set of slideable arms 62a easily move with respect to the stationary arms 60. The second set of slideable arms 62b is slideably interfaced to the first set of slideable arms 62a by another set of wheel trucks 64 and wheels 66. In this way, the second set of slideable arms 62b easily move with respect to the first set of slideable arms 62a. The third set of slideable arms 62c is slideably interfaced to the second set of slideable arms 62b by another set of wheel trucks 64 and wheels 66. In this way, the third set of slideable arms 62c easily move with respect to the second set of slideable arms 62b. Again, any number of slideable arms 62 is anticipated. Furthermore, in the present example, multiple sets of wheel trucks 62 and wheels 66 are anticipated per pair of arms 60/62 for added strength.

To limit the travel of the trucks 62 and wheels 66, stops 52 are fastened to the rails 62. The stops 52 limit the travel of the wheels 66.

Again, other mechanisms that achieve the same or similar extension of the arms 50 work in the present invention and are included here within.

Referring to FIG. 9, a detail cross section of the slideable interface between slideable arms 62a/b of the present invention is shown. In this view, two slideable arms 62a/b are shown with a wheel truck 64 affixed to a first of the slideable arms 62a by bolts 67 and nuts 68. The wheels 66 are rotatably held to the wheel truck 64 by screws 65 and the wheels 66 interface to slots 68 in the top and bottom surfaces of the second slideable arm 62b, enabling the first slideable arm 62a to slide along the second slideable arm 62b.

Referring to FIGS. 10A, 10B and 10C, a schematic view of the sheet holding apparatus 10 in various modes/configurations is shown next to a target vehicle 100. As shown, the sheet holding apparatus 10 is very compact, taking up minimal space in a print shop, sign shop, etc. The support arms 30/40 are shown substantially vertical and the extension arms 50 are substantially horizontal and withdrawn. The stand 12 rests on a surface (e.g. a garage floor) and the riser system 20 is retracted. As shown by the arrows, before affixing the of sheet material 80 to the support arms 30/40, the extension arms 50 are extended to the width of the sheet material 80. Once the extension arms 50 are extended to the desired distance between the support arms 30/40, the sheet material 80 is attached to the support arms 30/40 as shown in FIG. 10B. In some embodiments, the sheet material 80 is attached to the support arms 30/40 using an adhesive backing already present on the sheet material 80. In other embodiments, the sheet material 80 is attached to the support arms 30/40 using adhesive or tape such as masking tape, etc. In still other embodiments, the sheet material 80 is attached to the support arms 30/40 using a clamping mechanism (not shown) integrated with the support arms 30/40.

To accommodate non-horizontal vehicle sides such as the vehicle 100 shown in FIG. 10C, the sheet holding apparatus 10 tilts to match the horizontal angle of the surface of the vehicle on which the sheet material 80 is to be applied. Likewise, the support arms 30/40 also swing outwardly (see FIG. 4) and the adjustable riser system 20 adjust the height of the sheet material 80 for application on top surfaces of the vehicle 100 (e.g. the hood, trunk and roof). Although an automobile 100 is shown in this example, any vehicle is anticipated including cars, trucks, vans, mini-vans, boats, airplanes and the like.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for holding a sheet of material for application of the sheet of material onto a vehicle, the apparatus comprising:
   a base;
   a riser having a top end and a bottom end, the bottom end of the riser attached to the base and the riser extending vertically from the base;
   extension arms depend from the top end of the riser, outward ends of the extension arms extending outwardly from the riser at an adjustable distance from the riser;
   a left support arm attached to a left end of the extension arms; and
   a right support arm attached to from a right end of the extension arms;
   whereas a sheet of material is supported between the left support arm and the right support arm.

2. The apparatus for holding a sheet of material of claim 1, wherein the riser is adjustable in height and, therefore, the height of the extension arms is adjustable.

3. The apparatus for holding a sheet of material of claim 1, wherein the top end of the riser is hingedly affixed to the extension arms and the extension arms are adjustable such that the right and left support arms range from at least a vertical position for side of vehicle applications to a horizontal position for top of vehicle applications.

4. The apparatus for holding a sheet of material of claim 3, wherein the top end of the riser is hingedly affixed to the extension arms and the extension arms are further adjustable such that extension arms from a non-perpendicular angle with the riser.

5. The apparatus for holding a sheet of material of claim 1, further comprising a sheet of material, a first end of the sheet of material is removably affixed to the left support arm and a second end of the sheet of material is removably affixed to the right support arm.

6. The apparatus for holding a sheet of material of claim 1, wherein the left support arm is hingedly affixed to the left end of the extension arms and the right support arm is hingedly affixed to the right end of the extension arms.

7. A method of applying a sheet of material to a vehicle, the method comprising:
   providing an apparatus for holding the sheet of material, the apparatus comprising:
      a base;
      a riser, the riser attached to from the base and the riser extends vertically from the base;

extension arms depend from a top end of the riser, outward ends of the extension arms extend outwardly from the riser at an adjustable distance from the riser;

a left support arm attached to from a left end of the extension arms; and a right support arm attached to from a right end of the extension arms;

extending the extension arms to a point at which the left support arm and right support arm are at a distance apart sufficient for a length of the sheet of material;

affixing a first end of the sheet of material to the left support arm;

affixing a second end of the sheet of material to the right support arm;

positioning the apparatus for holding the sheet of material adjacent to a surface of the vehicle onto which the sheet of material is to be applied; and applying the sheet of material to the surface of the vehicle.

8. The method of claim 7, wherein the riser is adjustable in height and, therefore, the height of the extension arms is adjustable and the step of positioning further includes the step of adjusting a height of the extension arms.

9. The method of claim 7, wherein the top end of the riser is hingedly affixed to the extension arms and the extension arms are adjustable and the step of positioning further includes the step of adjusting the right and left support arms between a vertical position for side of vehicle applications and a horizontal position for top of vehicle applications.

10. The method of claim 9, wherein the top end of the riser is hingedly affixed to the extension arms and the step of positioning further includes the step of adjusting the extension arms to a non-perpendicular angle with the riser.

11. The method of claim 7, wherein the step of applying the sheet of material includes removing a protective cover from over an adhesive backing of the sheet of material and pressing the adhesive backing onto the surface of the vehicle.

12. An apparatus for holding a sheet of material for application of the sheet of material onto a vehicle, the apparatus comprising:

a base;

a riser having a bottom end and a distal top end, the bottom end of the riser attached to from the base and the riser extends vertically from the base, the riser is adjustable in a height measured between the first end of the riser and the distal second top end of the riser;

extension arms depend from the distal top end of the riser, outward ends of the extension arms extending outwardly from the riser at an adjustable distance from the riser;

a left support arm attached to from a left end of the extension arms by a hinge; and a right support arm attached to from a right end of the extension arms by a hinge.

13. The apparatus for holding a sheet of material of claim 12, wherein the riser comprises three sets of riser rails, the first set of riser rails affixed at an end to the base; a second set of riser rails slideably interfaced parallel to the first set of riser rails and the third set of riser rails slideably interfaced parallel to the second set of riser rails, whereas the extension arms are affixed to an end of the third set of riser rails that is distal from the end of the first set of riser rails that is affixed to the base.

14. The apparatus for holding a sheet of material of claim 12, wherein the top end of the riser is hingedly affixed to the extension arms and the extension arms are adjustable such that the right and left support arms swing from at least a vertical position for side of vehicle applications to a horizontal position for top of vehicle applications.

15. The apparatus for holding a sheet of material of claim 14, wherein the top end of the riser is hingedly affixed to the extension arms and the extension arms are further adjustable such that extension arms from a non-perpendicular angle with the riser.

16. The apparatus for holding a sheet of material of claim 12, further comprising a sheet of material, a first end of the sheet of material is removably affixed to the left support arm and a second end of the sheet of material is removably affixed to the right support arm.

17. The apparatus for holding a sheet of material of claim 12, wherein the left support arm is hingedly affixed to the left end of the extension arms and the right support arm is hingedly affixed to the right end of the extension arms.

18. The apparatus for holding a sheet of material of claim 12, wherein the each of the extension arms comprise a stationary extension rail and sets of slideable extension rails; the stationary extension rail is interfaced to the riser; a first of slideable extension rails is slideably interfaced and parallel to the stationary extension rail and each subsequent slideable extension rail is slideably interfaced and parallel to a previous slideable extension rail.

19. The apparatus for holding a sheet of material of claim 18, wherein the sets of slideable extension rails is three slideable extension rails.

* * * * *